US008088310B2

(12) United States Patent
Orr

(10) Patent No.: US 8,088,310 B2
(45) Date of Patent: Jan. 3, 2012

(54) ORR FORMULAR

(76) Inventor: Charles L. Orr, Savannah, GA (US)

( * ) Notice: Subject to any disclaimer, the term of this patent is extended or adjusted under 35 U.S.C. 154(b) by 264 days.

(21) Appl. No.: 12/457,311

(22) Filed: Oct. 22, 2009

(65) Prior Publication Data

US 2011/0266486 A1 Nov. 3, 2011

(51) Int. Cl.

| | |
|---|---|
| ***C09K 21/04*** | (2006.01) |
| ***C09K 21/06*** | (2006.01) |
| ***C09K 21/14*** | (2006.01) |
| ***A62D 1/00*** | (2006.01) |
| ***A62C 2/00*** | (2006.01) |

(52) U.S. Cl. ............ 252/603; 252/2; 252/606; 252/607; 169/44; 169/45; 169/46; 169/47; 169/54

(58) Field of Classification Search .............. 252/2, 603, 252/606, 607; 169/44, 45, 46, 47, 54
See application file for complete search history.

(56) References Cited

U.S. PATENT DOCUMENTS

| | | | | |
|---|---|---|---|---|
| 3,249,534 | A * | 5/1966 | Ware | 524/403 |
| 3,892,577 | A * | 7/1975 | Sugahara et al. | 106/14.12 |
| 4,339,405 | A * | 7/1982 | Paszner | 264/108 |
| 4,802,921 | A * | 2/1989 | Motoki | 106/18.12 |
| 5,691,436 | A * | 11/1997 | Blount | 528/26 |
| 5,693,840 | A * | 12/1997 | Blount | 556/404 |
| 2006/0214144 | A1* | 9/2006 | Bauer et al. | 252/609 |
| 2010/0120128 | A1* | 5/2010 | Liang | 435/266 |

* cited by examiner

*Primary Examiner* — Joseph D Anthony
(74) *Attorney, Agent, or Firm* — Charles L. Orr

(57) ABSTRACT

Each year wildfires, forest fires and out of control camp fires do untold damage to millions of acres of land, while causing billions of dollars in damages to property, wild life, and human life. The Orr Formula is designed to aid in, and assist the extinguishment of such fires. The Orr Formula is a composition that comprises: 1) 10% by weight Calcium Phosphate which acts as a binder; 2) 10% by weight Corn Starch which aids in flaking of the remaining composition off the site to which the composition was applied after the fire has been extinguished and cooled; and 3) 80% by weight of a mixture of Sodium Silicate with a base exchange Silicate of Sodium Aluminum.

1 Claim, No Drawings

ORR FORMULAR

FIELD OF INVENTION

In the Continental United States in the year 2003, there were 85, 943 wild land fires resulting in the destruction of 4,918,088 acres. This considerable number is not much different from the recorded 4,478,188 acres destroyed in 1960. This number although sizable gives no picture of the level of the devastation to property, wild life, and human life. The technological advances in the past 40 years seem to give no ease to the situation.

C. L. Orr, the instant inventor, upon learning the extent of yearly devastation caused by wildfires began experimenting from his Savannah home in 1981. He has tested the effects of combinations of harmless chemicals on controlled fires. He believes that he has a formula that safely extinguishes potentially hazardous fires with an effectiveness that is unprecedented. In addition, the cost efficiency, readiness of materials, and environmental safety of this product make this invention a viable service to the community and Earth.

BRIEF SUMMARY OF THE INVENTION

The Orr Formula is a light powder that when dispensed evenly on an inflamed surface extinguishes fire rapidly. After the area has cooled, the Orr Formula can flake off easily and be blown away. A crop-duster plane could be effective in distributing the material over a fire resulting in its extinguishment on contact.

DETAILED DESCRIPTION OF THE INVENTION

The ingredients in the Orr Formula, which is a composition, are as follows: 10% by weight Calcium Phosphate; 10% by weight Corn Starch, and 80% by weight of a mixture of Sodium Silicate with a base exchange Silicate of Sodium Aluminum. When dispensed on a fire, the main ingredient of the Orr Formula, Sodium Silicate with a base exchange Silicate of Sodium Aluminum, changes from a solid powder to a liquid due to the heat intensity of the fire. The base exchange Silicate is then released into the air. During this process, the Calcium Phosphate (which does not burn) acts a binder, insuring an even cover to smother the fire. After the site has cooled, the cornstarch allows the Orr Formula to lift easily from the site and be blown away. All the components of the Orr Formula are non-toxic.

The invention claimed is:

1. A fire extinguishing composition (i.e. the Orr Formula) comprising:

1) 10% by weight Calcium Phosphate which acts as a binder;

2) 10% by weight Corn Starch which aids in flaking of the remaining composition off the site to which the composition was applied after the fire has been extinguished and cooled; and 3) 80% by weight of a mixture of Sodium Silicate with a base exchange Silicate of Sodium Aluminum;

wherein said fire extinguishing composition is especially useful to control wildfires, forest fires and camp fires.

* * * * *